（12） United States Patent
Geiges

(10) Patent No.: US 11,940,457 B2
(45) Date of Patent: Mar. 26, 2024

(54) ROBOTIC ARM OF AN AUTOMATED PIPETTING SYSTEM

(71) Applicant: TECAN TRADING AG, Mannedorf (CH)

(72) Inventor: Thomas Geiges, Mannedorf (CH)

(73) Assignee: TECAN TRADING AG, Mannedorf (CH)

( * ) Notice: Subject to any disclaimer, the term of this patent is extended or adjusted under 35 U.S.C. 154(b) by 149 days.

(21) Appl. No.: 17/524,217

(22) Filed: Nov. 11, 2021

(65) Prior Publication Data

US 2022/0155327 A1 May 19, 2022

(30) Foreign Application Priority Data

Nov. 16, 2020 (EP) .................................. 20 207 870

(51) Int. Cl.
*B01L 3/02* (2006.01)
*B01L 9/00* (2006.01)
*B25J 18/00* (2006.01)
*G01N 35/00* (2006.01)
*G01N 35/10* (2006.01)
(Continued)

(52) U.S. Cl.
CPC .......... *G01N 35/0099* (2013.01); *B01L 3/021* (2013.01); *B01L 9/54* (2013.01); *B25J 18/00* (2013.01); *B01L 2300/0645* (2013.01); *B01L 2300/0663* (2013.01); *B01L 2300/12* (2013.01);
(Continued)

(58) Field of Classification Search
CPC ..... G01N 2035/1013; G01N 2035/103; G01N 35/0099; B01L 3/021; B01L 9/54; B01L 3/0275; B01L 2300/0645; B01L 3/02; B01L 3/0279; B01L 3/275; B01L 2300/02; B25J 18/00; H01H 15/10; H01H 15/06; H01H 2221/014; H10H 2201/004
See application file for complete search history.

(56) References Cited

U.S. PATENT DOCUMENTS 4,012,608 A    3/1977   Lockard
4,191,867 A    3/1980   Feaster
(Continued)

FOREIGN PATENT DOCUMENTS

DE    102004025581 A1 * 12/2005    ......... H03K 19/1733

*Primary Examiner* — Jill A Warden
*Assistant Examiner* — Michael Stanley Gzybowski
(74) *Attorney, Agent, or Firm* — Notaro, Michalos & Zaccaria P.C.

(57) ABSTRACT

A robotic arm of an automated pipetting system has a pipetting tip adapter and a slide switch to detect the presence of pipetting tips on the pipetting tip adapter is disclosed. The slide switch has first support member and second support member configured to slide relative to one another between first and second positions along a movement axis, an electrically conducting contact pad arranged on the first support member, an electrically conducting terminal physically attached to second support member in physical contact with the contact pad when support members are in first position, where the terminal is a first resilient wiping member expanding along the movement axis, first wiping member is not in physical contact with the contact pad when support members are in second position, and an electric current can flow between first wiping member and the contact pad when support members are in first position.

11 Claims, 7 Drawing Sheets

Figure 1A:
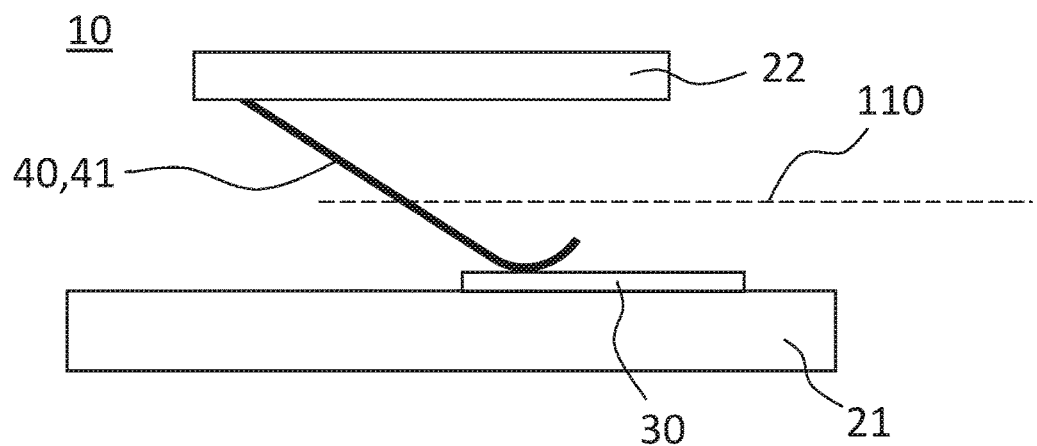

(51) Int. Cl.
*H01H 1/40* (2006.01)
*H01H 3/16* (2006.01)

(52) U.S. Cl.
CPC ... *B01L 2300/123* (2013.01); *B01L 2300/126* (2013.01); *G01N 2035/1013* (2013.01)

(56) References Cited

U.S. PATENT DOCUMENTS

| | | | |
|---|---|---|---|
| 4,376,234 A | 3/1983 | Liiitaud et al. | |
| 5,273,717 A * | 12/1993 | Marvin | B01L 3/0279 33/561 |
| 7,220,926 B2 | 5/2007 | Mano | |
| 7,851,714 B2 | 12/2010 | Kakuno | |
| 2016/0200290 A1 * | 7/2016 | Johnson | A44B 11/2534 200/61.58 B |

* cited by examiner

ROBOTIC ARM OF AN AUTOMATED PIPETTING SYSTEM

The invention relates to a robotic arm of an automated pipetting system comprising a pipetting tip adapter and a slide switch to detect the presence of pipetting tips on said adapter.

Electric switches are very common and can be found in household equipment, cars, and basically in any electrical device. Many different types are in use, the most common being an electromechanical device consisting of one or more sets of movable electrical contacts, which when touching can let current pass between them. Many specialized forms exist to meet the specific demands. In robotics switches often function as sensing elements to detect liquid level, pressure, temperature, or the position of a machine part. Such switches need to be tiny and to meet high demands in service life. Reed switches have been widely used as sensing elements in robotics. They are actuated by an electromagnetic coil or a permanent magnet and return to their original position when the magnetic field is removed.

An example of a reed switch application is its use for the detection of the presence of a pipetting tip on a tip adapter in an automated pipetting system. The size and ability to withstand several million switching cycles have made the reed switch the switch of choice for such applications. When a pipetting tip is loaded, the magnet moves away from the reed, which opens the contact as a result.

However reed switches bear a significant risk for being destroyed by electrostatic discharge (ESD) even at low voltage, causing service and material costs. Also reed switches are sensitive to magnetic fields in close proximity, e.g. used for magnetic bead separation. The closing or opening of a reed by mistake triggered by a magnetic field, or damage by ESD, can be disruptive to the automated pipetting protocol and the system itself.

Automated pipetting applications and particularly the detection of pipetting tips on robotic arms have therefore driven the need for small electric switches that are resistant to ESD and to magnetic fields and nevertheless withstand several million switching cycles. Microswitches have shown to be one of the best alternatives from a wide range of mechanical switches, however it has been observed in known microswitches that the switch action requires much force and is not always reliable, and that their life cycles are well below the required several million switching cycles. Even slide switches that perform somewhat better than other types often rely on springs or snap-action as disclosed e.g. in U.S. Pat. Nos. 4,012,608 and 4,191,867. They are vulnerable to contact bounce, i.e. bouncing apart one or more times before making steady contact, resulting in misinterpretation of the on-off pulses, and to premature wear, resulting in unexpected product failure and therefore work interruption, added service work and costs. Slide switches in which a sliding element bridges two contacts in one position but not in another have been disclosed e.g. in U.S. Pat. Nos. 7,851,714 B2, 4,376,234, and 7,220,926 B2. Even though these switches provide for improved switch actions, their mechanical resistance is still too high, their life cycle is too short for many robotic applications, and their structure, often with casings and pins do not fit most instruments as e.g. an automated pipetting system.

It is thus an object of the present invention to provide for a robotic arm of an automated pipetting system with a passive switch, i.e. without any external power supply, detecting the presence of pipetting tips on a pipetting tip adapter, that is not disturbed by ESD and external magnetic fields, is small (less than $3.5 \times 8 \times 11$ mm$^3$), shows minimal mechanical resistance in switch actions, and the ability to withstand several million switching cycles.

This is solved by a robotic arm with a slide switch according to claim 1. Embodiments can, for example, be derived from the respective dependent claims.

The invention relates to a robotic arm of an automated pipetting system comprising a slide switch to detect the presence of pipetting tips on a pipetting tip adapter.

The robotic arm of an automated pipetting system according to the invention comprises a pipetting tip adapter and a slide switch to detect the presence of pipetting tips on said pipetting tip adapter, the slide switch comprising a first support member and a second support member configured to slide relative to one another between first and second positions along a movement axis, an electrically conducting contact pad arranged on said first support member, and an electrically conducting terminal physically attached to said second support member in physical contact with said contact pad when said support members are in the first position. Said terminal is a first resilient wiping member expanding along said movement axis, and said first wiping member is not in physical contact with said contact pad when said support members are in the second position, and an electric current can flow between said first wiping member and said contact pad when said support members are in the first position, and said electric current between said wiping member and said contact pad is disrupted when said support members are in the second position.

A resilient wiping member according to the invention may be a bendable wiper constructed in such a way that when pushed towards the contact pad its pressing force on the contact pad does not significantly change, and that it returns to its initial state when the pushing force is released. The wiping member may be one elongate body or may be made of two or more essentially parallel elongate bodies, e.g. in the form of a brush. The one or more elongate bodies expand along said movement axis, indicating that they are attached to said second support member such that their elongate bodies lie essentially parallel to said movement axis.

The wiping member has to be electrically conductive and therefore comprises at least an electrically conductive layer containing one or more conductive materials. Known electrically conductive materials are mainly metals and metal alloys including silver, copper, gold, aluminum, zinc, nickel, brass, bronze, iron, platinum, carbon steel, lead, and stainless steel, but can also be non-metal, e.g. graphite, conductive polymers, and composites of non-conductive polymers with conductive fillers, such as carbon fiber reinforced polymer or epoxy resin with silver spheres.

The contact pad according to the invention may be any flat blank or plate that is electrically conductive and therefore comprises one or more electrically conductive layers comprising one or more conductive materials. Consequently the contact pad may comprise one or more of the following materials; silver, copper, gold, aluminum, zinc, nickel, brass, bronze, iron, platinum, carbon steel, lead, stainless chrome-nickel steel, graphite, conductive polymers, and composites of non-conductive polymers with conductive fillers. In an embodiment, the contact pad comprises a surface made from an electrically conductive material that is durable and therefore resistant to abrasion through the rubbing action of the wiping members. Suitable hard materials may be carbon steel, stainless chrome-nickel steel, vanadium steel, iron, nickel, zinc, brass, copper, platinum, silver, and hard gold, which are more or less durable depending on their treatment, e.g. they may be hardened, drawn, cast, chilled. In an embodiment, the contact pad is formed on a printed circuit board through etching followed by plating with hard gold, i.e. gold that has been alloyed with one or more elements to alter the grain structure of the gold to achieve a harder deposit. The most common alloying elements used in hard gold plating are nickel, cobalt, and iron.

According to the invention said first support member may be any electrically isolating solid structure holding in place said contact pad and optionally a gliding pad. Said first support member may be a printed circuit board or be made of one or more electrical insulating materials, such as glass, paper and polytetrafluoroethylene (PTFE), which have high resistivity, or rubber-like polymers and most plastics.

According to an embodiment, said first support member comprises an electrically conductive material partially or completely coated with an electrically isolating material, such that an electric current between said first wiping member and said contact pad is disrupted when said support members slide to the second position along a movement axis, in which said first wiping member is in physical contact with said first support member.

In a further embodiment, said first support member is made of a material that is durable and therefore resistant to abrasion through the rubbing action of the wiping members, e.g. glass, PTFE, or a printed circuit board comprising one or more layers that may comprise one of the following; paper impregnated with a phenol formaldehyde resin or epoxy, a woven fiberglass cloth impregnated with an epoxy resin, aluminum, metal core board or insulated metal substrate (IMS), clad with thermally conductive thin dielectric, glass and polyester, glass and epoxy, PTFE, or polyimide.

The second support member according to the invention may be any electrical insulating solid structure holding in place and at an even distance from the contact pad said first wiping member and said second wiping member. The second support member may therefore comprise materials such as glass, paper and polytetrafluoroethylene (PTFE), which have high resistivity, or rubber-like polymers and most plastics.

According to an embodiment, a second electrically conducting resilient wiping member expanding along said movement axis can be physically attached to said second support member, said second wiping member being in physical contact with said contact pad (30) so that electric current can flow between said first wiping member (41) and said second wiping member (42) across said contact pad (30) when said support members (21, 22) are in the first position.

According to an embodiment, said first support member comprises an electrically conductive material partially or completely coated with an electrically isolating material, arranged such that said first wiping member is electrically isolated from said second wiping member, and that an electric current can flow between said first wiping member and said second wiping member only when said support members are in the first position in which both resilient wiping members are in contact with said contact pad.

The slide switch to detect the presence of pipetting tips on a pipetting tip adapter according to the invention may be used with electrical signal circuits of low voltage, e.g. 2-5 V, and very small current. According to the invention an electrical signal circuit is closed when the capacitive measurement of the switch state is >60 pF, while it is open when the capacitive measurement is <5 pF. These states may be detected by an electrical detection unit, which may pass on a signal to a central processor.

According to an embodiment, the slide switch comprises an electrical signal circuit comprising an electrical power supply and an electrical detection unit, which may measure electrical resistance and may pass on a signal to a central processor.

According to an embodiment, the slide switch comprises a contact pad that is arranged on said first support member such that it is level with the first support member. This allows the wiping members to smoothly slide from one position to another with minimal abrasion of the wiping members as well as the contact pad and the first support member.

According to an embodiment, the slide switch comprises a contact pad that is formed on a printed circuit board by etching the copper surface. The thereby created contact pad projects above said first support member by 20-40 µm.

According to an embodiment, the slide switch comprises a contact pad that is attached to said first support member and thereby projects above said first support member.

According to an embodiment, the slide switch comprises a gliding pad arranged next to but electrically isolated from said contact pad. The contact pad and gliding pad are spatially separated forming a gap. The gap is formed with the intention to electrically isolate the contact pad from the gliding pad. At the same time it is important that the gap is not too wide to reduce abrasion of the first support member, the contact pad, and the gliding pad. The material of the gap may be the material of the first support member, which may be a printed circuit board or be made of or be coated with one or more electrical insulating materials. Preferably it is made of a material that is durable and therefore resistant to abrasion through the rubbing action of the wiping members, e.g. glass, PTFE, or a printed circuit board comprising one or more layers that may comprise one of the following; paper impregnated with a phenol formaldehyde resin or epoxy, a woven fiberglass cloth impregnated with an epoxy resin, aluminum, metal core board or insulated metal substrate (IMS), clad with thermally conductive thin dielectric, glass and polyester, glass and epoxy, PTFE, or polyimide.

According to an embodiment, the slide switch comprises a gliding pad arranged next to said contact pad, the gliding pad and contact pad being level. They may be projecting above said first support member.

According to an embodiment, the slide switch comprises a gliding pad arranged next to said contact pad forming a gap, said gap comprising a solder mask to further reduce abrasion of the first wiping member, the contact pad, and the gliding pad. According to an embodiment, the slide switch comprises a gliding pad arranged next to said contact pad forming a gap, the gap comprising one or more additional gliding pads. This results in less abrasion of the first wiping member, the contact pad, and the gliding pad, without having to reduce the gap width, which could otherwise cause electric bridging of the gliding pad and contact pad.

According to an embodiment, the slide switch comprises one or more gliding pads arranged next to said contact pad, whereas the surface of the contact pad, the one or more gliding pads, and the gap are level. This allows the wiping members to smoothly slide from one position to another with minimal abrasion of the wiping members as well as the contact pad, the one or more gliding pads, and the gap.

According to an embodiment, the slide switch has external dimensions small enough to fit in any robotic application, especially in a tip adapter for an automated pipetting application, i.e. the external dimensions are smaller than 3.5×8×11 mm3.

According to an embodiment, the slide switch can be used in connection with an actuating mechanism, e.g. a pusher with spring, which can be used for the release of pipetting tips. An actuating mechanism in a tip adapter for an automated pipetting application may be a pusher with spring, where the spring-force in the closed position may be between 0.3 and 1.5 N, more preferably between 0.6 and 1.2 N, and where the slide distance may be between 2 and 10 mm, more preferably between 5 and 7 mm. The sliding switch may be open when the spring is relaxed, however in an embodiment for a tip adapter in an automated pipetting application the sliding switch is closed when the spring is relaxed.

Although the foregoing invention has been described in some detail for the purpose of illustration, it will be obvious that changes and modifications may be practiced within the scope of the appended claims by those of ordinary skill in the art.

The solution according to the invention, at least in preferred embodiments, inter alia achieves the following advantages:

The slide switch applies contacts that have a wiping action. This ensures clean surfaces and that the contact pressure can be quite high and yet show minimal mechanical resistance in switch actions.

This results in a prolonged resistance to dust, which in a laboratory environment can be several years.

Another advantage comes from the simple construction made of only a few parts, which allows for a compact space saving design smaller than 3.5×8×11 mm³. The slide switch can therefore easily be used for any small application.

In an embodiment with a second electrically conducting resilient wiping member physically attached to the second support member, such that said second wiping member is in physical contact with the contact pad and electric current can flow between the first wiping member and said second wiping member across said contact pad when the support members are in the first position, both electric contacts can be on the wiping members. By avoiding that one of the contacts has to be mounted on the sliding part while the other one is on the stationary part, the slide switch will be even more durable and likely to withstand several million switching cycles due to more simple wiring without any moving and bending wires and shifting soldering joints.

Furthermore the slide switch according to the invention does not use any magnets and is therefore protected from false closing or opening, and cannot be damaged through external magnetic fields from larger electromagnetic coils or permanent magnets. This allows the slide switches to be used in close proximity to magnets without the risk of interference. An example of such an application is its use for the detection of the presence of a pipetting tip on a tip adapter in an automated pipetting system where these tip adapters can come in close proximity with magnetic fields, such as used for magnetic bead separation.

As a result, the slide switch according to the invention is more reliable, safer, and less expensive, e.g. by avoiding consequential costs for abandoning automated pipetting protocols or for damages to the robot.

The slide switch according to the invention is also resistant to electrostatic discharge (ESD) preventing its destruction and disruption to the automated pipetting protocol and the system itself.

Also the slide switch according to the invention convert mechanical movements to electrical signals is a passive switch and therefore does not use any external power supply.

Taken together these improvements also cause the slide switch to be resistant to important chemicals frequently used around robots and automated pipetting systems, as i.e. cleaning liquids, ethanol, and isopropanol. Slide switches according to the invention have shown to be resistant up to 7 days in saturated vapors of any of the following: water, DMSO, ethanol, methanol, hexane, acetone, chloroform, hydrochloric acid 5M, sodium hydroxide 1M, and sodium hypochlorite (bleach) 5%.

Through its simple principle and choice of materials it can also reliably operate at a wide temperature range, most preferably at 15-32° C. at 30-80% relative humidity, and can be stored at −20° C. to +60° at 20-80% relative humidity.

Overall the slide switch according to the invention will consequently have a prolonged lifespan compared to other microswitches, and will show a high reliability of correct switch state during lifetime and after prolonged storage of several years, making it safer causing less work and lower operating costs.

Furthermore advantages and conveniences of the invention result from the following description of embodiments based on the drawings.

Figure 1B:
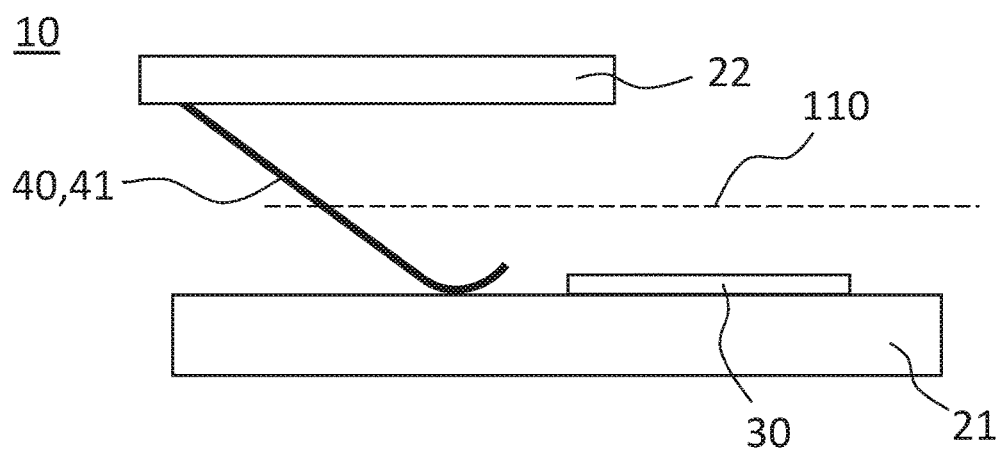
Figure 2A:
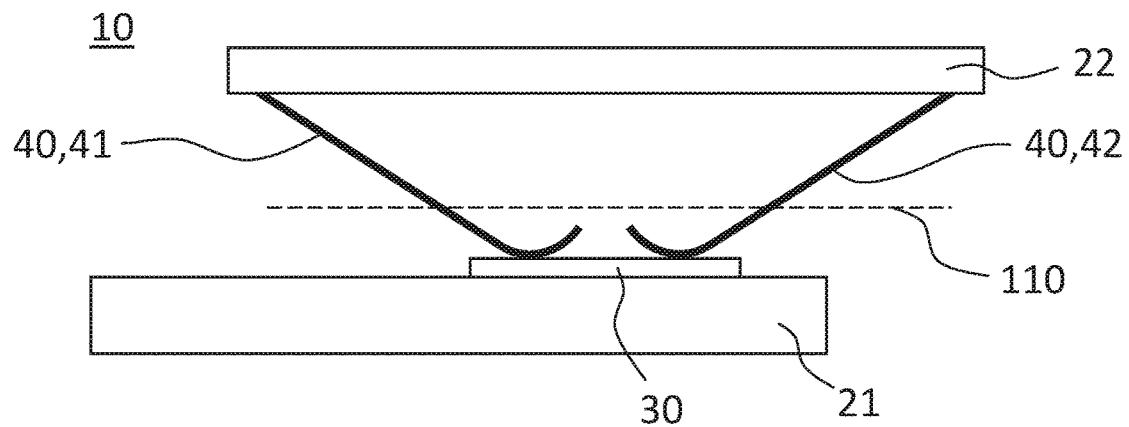
Figure 2B:
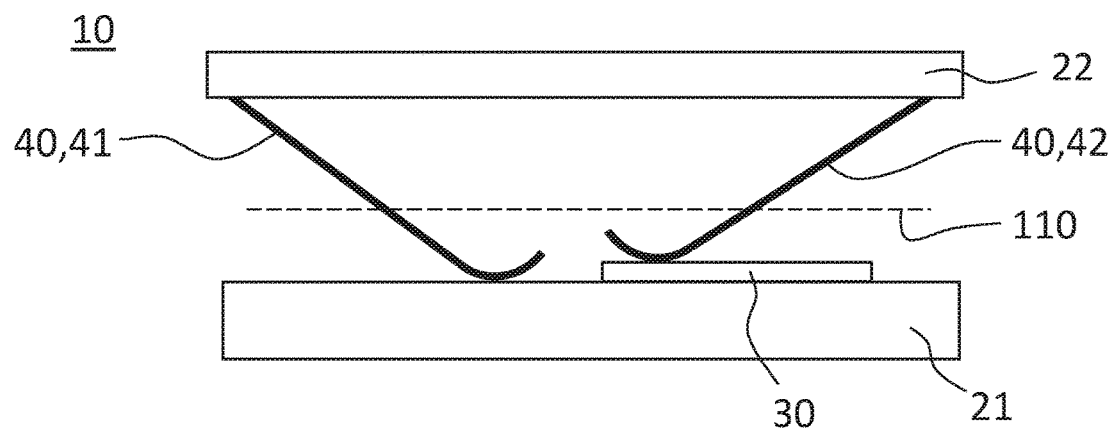
Figure 3A:
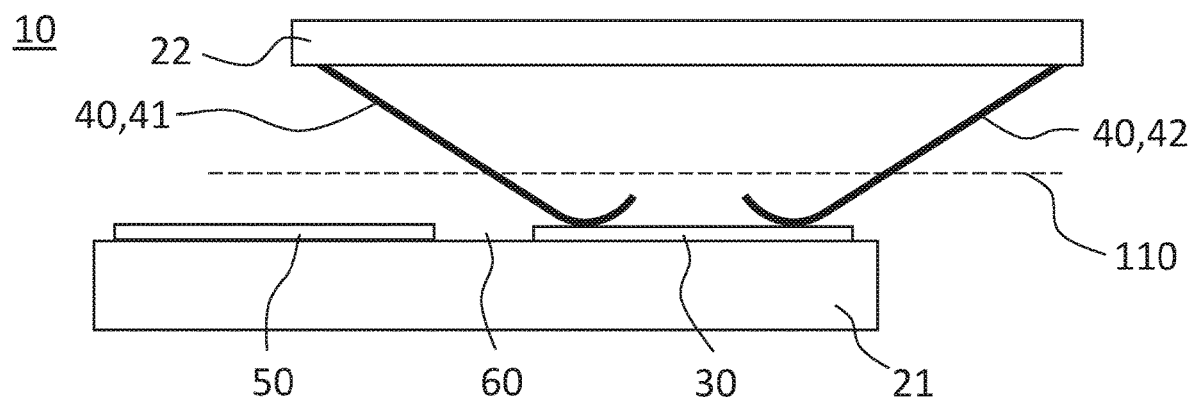
Figure 3B:
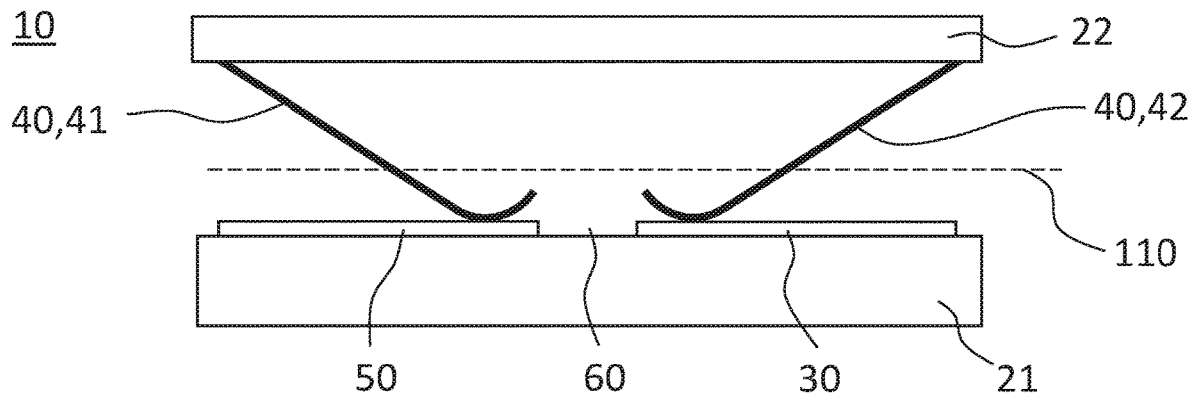
Figure 4A:
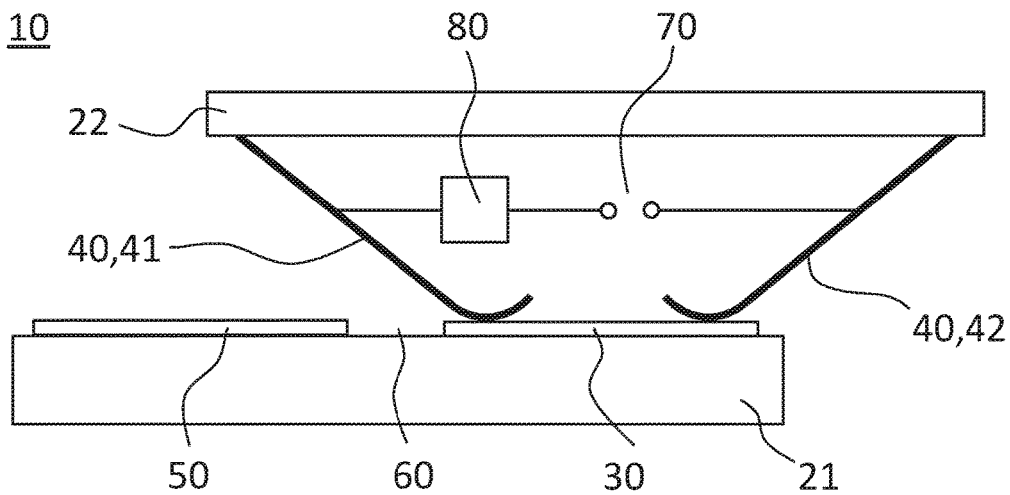
Figure 4B:
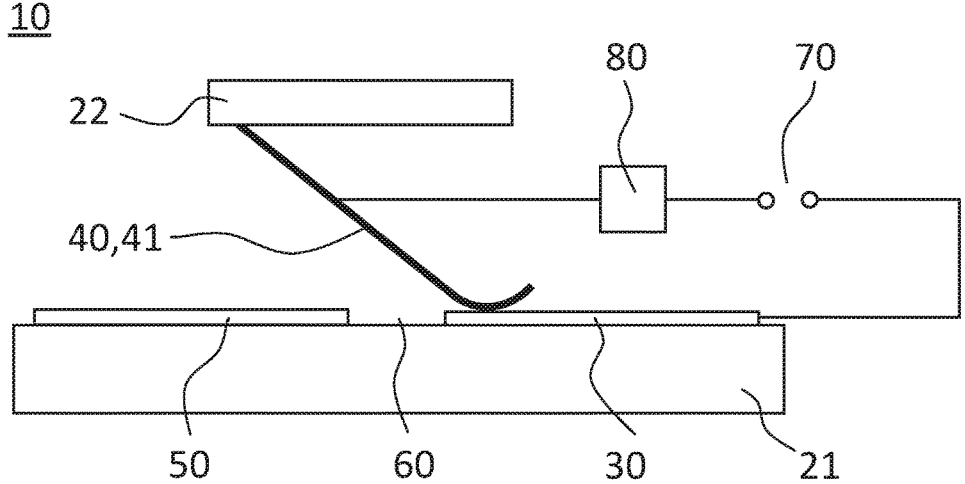
Figure 5A:
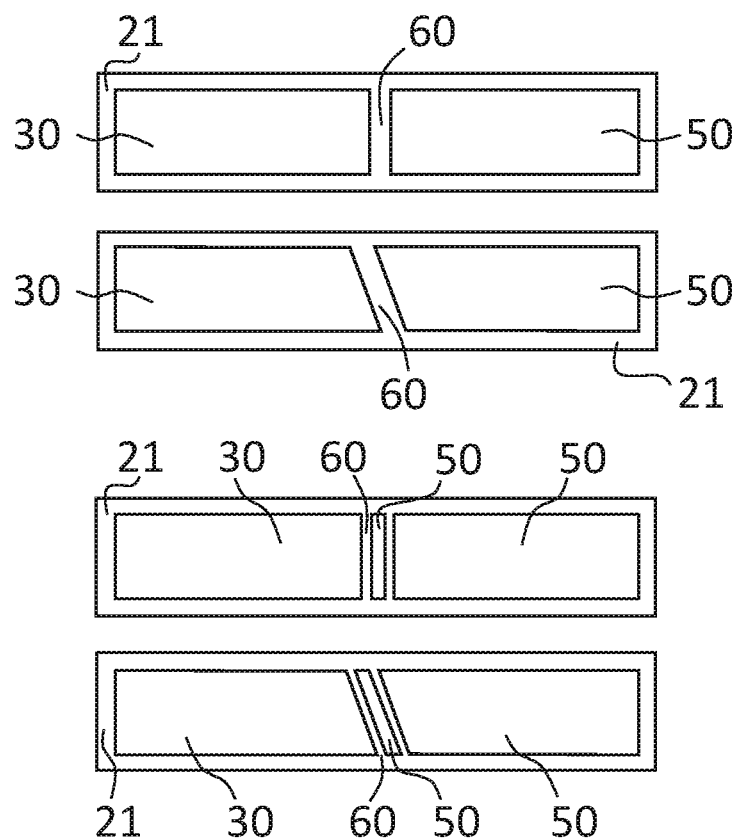
Figure 5B:
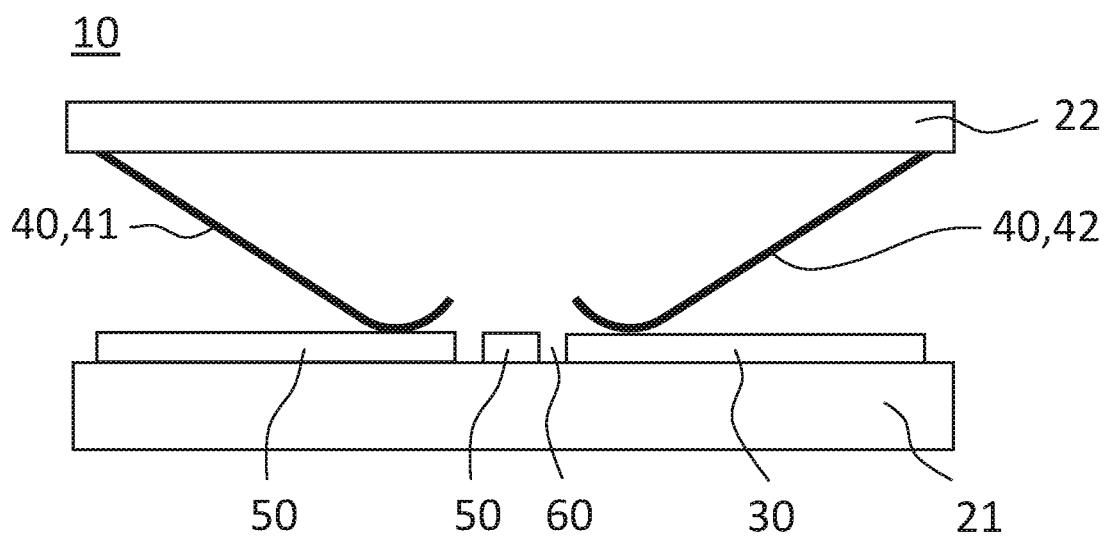
Figure 6:
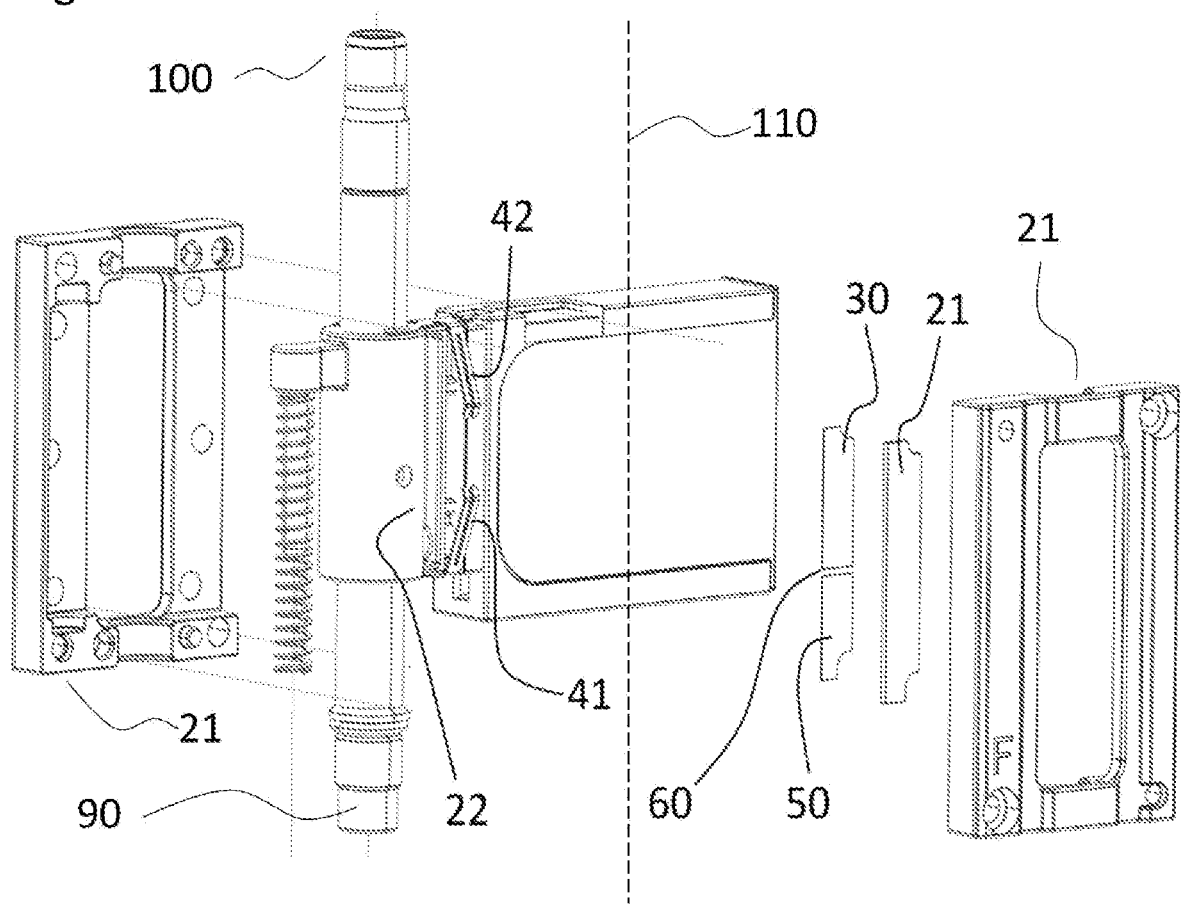
Figure 7:
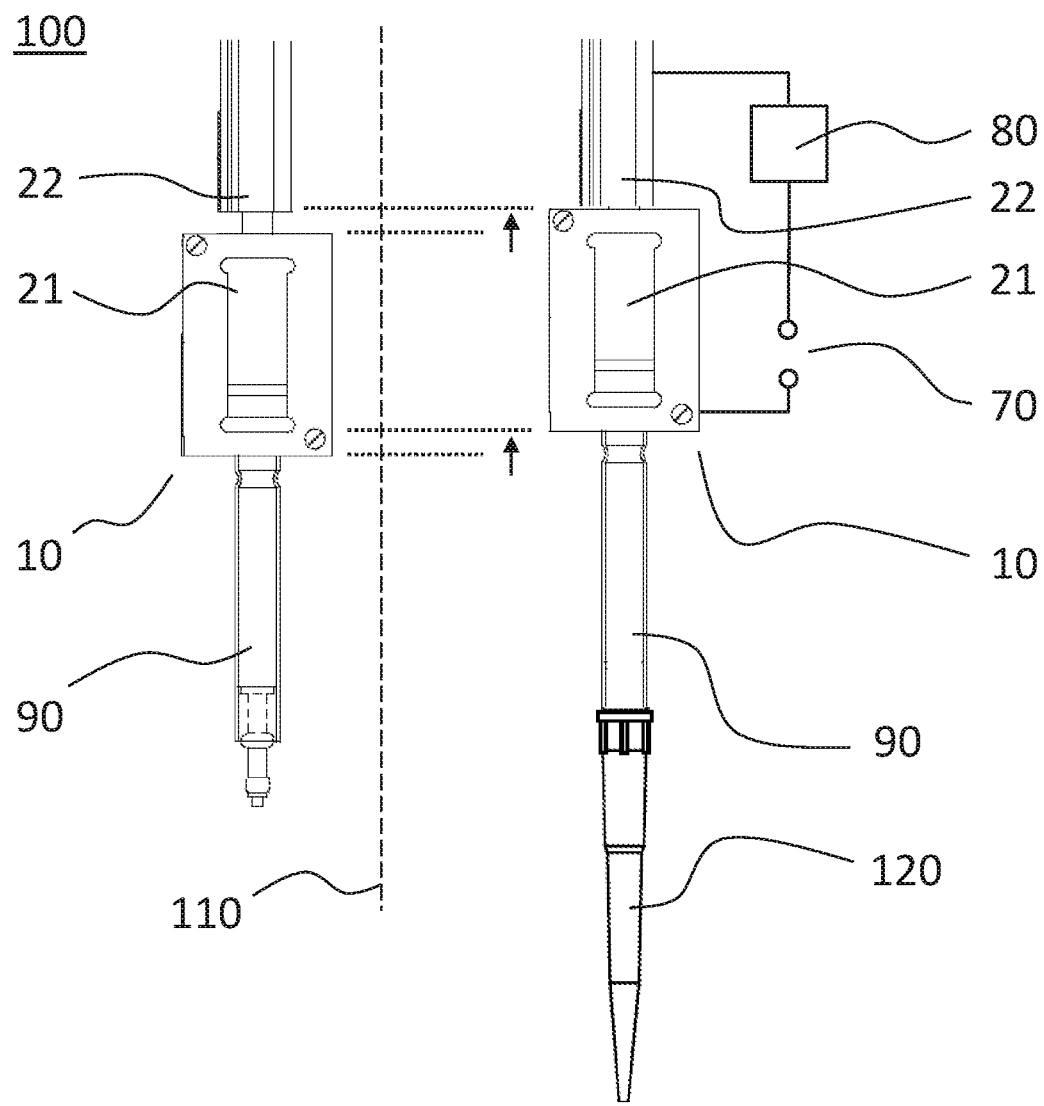

The invention will be described in detail with respect to the drawings schematically depicting embodiments of the invention. In detail:

FIG. 1*a* shows a schematic full sectional view of a slide switch according to the invention in the first position, and FIG. 1*b* shows a schematic full sectional view of the slide switch shown in FIG. 1*a* in the second position, and FIG. 2*a* shows a schematic full sectional view of a slide switch with a second wiping member according to the invention in the first position, and FIG. 2*b* shows a schematic full sectional view of the slide switch shown in FIG. 2*a* in the second position, and FIG. 3*a* shows a schematic full sectional view of a slide switch with a gliding pad according to an embodiment of the invention in the first position, and FIG. 3*b* shows a schematic full sectional view of a slide switch with a gliding pad shown in FIG. 2*a* in the second position, and FIG. 4*a* shows a schematic full sectional view of a slide switch with a gliding pad and an electrical signal circuit according to an embodiment of the invention with one wiping member, and FIG. 4*b* shows a schematic full sectional view of a slide switch with a gliding pad and an electrical signal circuit according to an embodiment of the invention with two wiping members, and FIG. 5*a* shows layouts of contact and gliding pads on first support members according to embodiments of the invention, and FIG. 5*b* shows a schematic full sectional view of a slide switch with two gliding pads according to an embodiment of the invention in the second position, and FIG. 6 shows a schematic exploded view of the lower part of a robotic arm of an automated pipetting system comprising a pipetting tip adapter and a slide switch according to an embodiment of the invention used to detect the presence of a pipetting tip, and FIG. 7 shows schematic side views of the lower part of a robotic arm of an automated pipetting system according to an embodiment of the invention comprising a slide switch and a pipetting tip adaptor before (left) and after (right) picking up a pipetting tip.

FIG. 1*a* shows a schematic full sectional view of a slide switch 10 according to the invention in the first position.

The slide switch 10 shown here comprises a first support member 21 and a second support member 22 configured to slide relative to one another between first and second positions along a movement axis 110 shown as a dashed line. A terminal 40 in the form of a first resilient and inherently stable wiping member 41 is physically attached to said second support member 22 and is in physical and electrical contact with an electrically conducting contact pad 30 when the slide switch 10 is in the first position as shown. The purpose of said second support member 22 is to hold said first wiping member 41 in place and at an even distance from the first support member 21. The contact pad 30 has to be electrically conducting at least on the surface so that an electric current can flow between said first wiping member 41 and said contact pad 30 when said support members 21,22 are in the first position as shown. The contact pad 30 may be mounted on said first support member 21, or may be formed on a printed circuit board through etching. In the embodiment shown, the contact pad 30 projects above said first support member 21.

FIG. 1*b* shows a schematic full sectional view of the slide switch shown in FIG. 1*a* in the second position. As shown the first wiping member 41 is not in physical contact with the contact pad 30 when said support members 21,22 are in the second position. Instead the first wiping member 41 is in physical contact with the first support member 21, which comprises one or more electrical insulating materials, as e.g. glass, paper, polytetrafluoroethylene, rubber-like polymer, plastic. As a result no electric current can flow between said first wiping member 41 and said contact pad 30 when said support members 21,22 are in the second position as shown.

FIG. 2*a* shows a schematic full sectional view of a slide switch 10 according to the invention in the first position.

The slide switch 10 shown here comprises a first support member 21 and a second support member 22 configured to slide relative to one another between first and second positions along a movement axis 110 shown as a dashed line, and a contact pad 30 attached to or an integral part of said first support member 21. A terminal 40 in the form of a first resilient wiping member 41 and a terminal 40 in the form of a second resilient wiping member 42 are physically attached to said second support member 22 and are in contact with said contact pad 30 when the slide switch 10 is in the first position as shown. According to the invention an electric current can flow between said first wiping member 41 and said contact pad 30 when said support members 21,22 are in the first position as shown. In the embodiment shown an electric current can flow between said first wiping member 41 and said second wiping member 42 through said contact pad 30 when said support members 21,22 are in the first position as shown.

The purpose of said second support member 22 is to hold both wiping members 41, 42 in place and at an even distance from the first support member 21. The material of said second support member 22 has to be electrically isolating so that it does not electrically connect the first wiping member 41 with the second wiping member 42. In contrast the contact pad 30 has to be electrically conducting at least on the surface so that an electric current can flow between said first wiping member 41 and said contact pad 30 when said support members 21,22 are in the first position as shown. The contact pad 30 may be mounted on said first support member 21, or may be formed on a printed circuit board through etching. In the embodiment shown, the contact pad 30 projects above said first support member 21.

FIG. 2*b* shows a schematic full sectional view of the slide switch shown in FIG. 2*a* in the second position.

In the embodiment shown, only the second resilient wiping member 42 is in contact with said contact pad 30 when the support members 21, 22 are in the second position as shown. Said first wiping member 41 has broken contact with said contact pad 30 and is in physical contact with the first support member 21, which comprises one or more electrical insulating materials. As a result no electric current can flow between said first wiping member 41 and said contact pad 30 when said support members 21,22 are in the second position as shown.

FIG. 3*a* shows a schematic full sectional view of a slide switch 10 with a gliding pad 50 according to an embodiment of the invention in the first position. The slide switch 10 shown here comprises a first support member 21 and a second support member 22 configured to slide relative to one another between first and second positions along a movement axis 110 shown as a dashed line. A terminal 40 in the form of a first resilient wiping member 41 and a terminal 40 in the form of a second resilient wiping member 42 are physically attached to said second support member 22 and are in contact with a contact pad 30 when the slide switch 10 is in the first position as shown. The contact pad 30 may be mounted on said first support member 21, or may be formed on a printed circuit board through etching. In the embodiment shown, the contact pad 30 projects above said first support member 21. The contact pad 30 has to be electrically conducting at least on the surface so that an electric current can flow between said first wiping member 41 and said contact pad 30 when said support members 21,22 are in the first position as shown. In the embodiment shown an electric current can flow between said first wiping member 41 and said second wiping member 42 through said contact pad 30 when said support members 21,22 are in the first position as shown. The contact pad 30 may be mounted on said first support member 21, or may be formed on a printed circuit board through etching. In the embodiment shown, the contact pad 30 as well as the gliding pad 50 project above said first support member 21 and are level.

FIG. 3*b* shows a schematic full sectional view of the slide switch 10 with a gliding pad 50 shown in FIG. 3*a* in the second position.

As shown the first wiping member 41 is not in physical contact with the contact pad 30 when said support members 21,22 are in the second position. Instead the first wiping member 41 is in physical contact with the gliding pad 50. The contact pad 30 and gliding pad 50 are spatially separated forming a gap 60. According to the invention said gap 60 may comprise a solder mask. Also the first support member 21 may comprise one or more additional gliding pads 50. This can be in the form of a protective element in said gap 60 as shown in FIG. 5. According to the invention the gliding pad 50 is electrically isolated from said contact pad 30, no electric current can flow between said first wiping member 41 and said contact pad 30 when said support members 21,22 are in the second position as shown.

FIG. 4*a* shows a schematic full sectional view of a slide switch 10 with two terminals 40, a gliding pad 50, and an electrical signal circuit according to an embodiment of the invention where the support members 21,22 are in the first position. A terminal 40 in the form of a first resilient wiping member 41 and a terminal 40 in the form of a second resilient wiping member 42 are physically attached to a second support member 22 and are in contact with the contact pad 30 when the slide switch 10 is in the first position as shown. According to the invention an electric current can flow between said first wiping member 41 and said contact pad 30 in the first position as shown. In the embodiment shown an electric current can flow between said first wiping member 41 and said second wiping member 42 through said contact pad 30. When said support members 21,22 are in the first position as shown, the electrical signal circuit comprising an electrical power supply 70 and an electrical detection unit 80 is therefore closed.

FIG. 4b shows a schematic full sectional view of a slide switch 10 with one terminal 40, a gliding pad 50, and an electrical signal circuit according to an embodiment of the invention where the support members 21,22 are in the first position. The terminal 40 is in the form of a first resilient wiping member 41 and is physically attached to said second support member 22 and is in contact with a contact pad 30 when the slide switch 10 is in the first position as shown. According to the invention an electric current can flow between said first wiping member 41 and said contact pad 30 in the first position as shown. The electrical signal circuit comprising an electrical power supply 70 and an electrical detection unit 80 is therefore closed.

FIG. 5a shows layouts of contact pads 30 and gliding pads 50 on first support members 21 according to embodiments of the invention. The contact pad 30 and one or more gliding pads 50 are spatially separated forming one or more gaps 60. The gaps 60 are formed with the intention to electrically isolate the contact pad 30 from the one or more gliding pads 50. At the same time it is important that the gap 60 is not too wide to reduce abrasion of the first support member 21, the one terminal 40 in the form of a first resilient wiping member 41, and the other terminal 40 in the form of a second resilient wiping member 42. To further reduce the gap width without the risk of bridging the pads, two or more gliding pads 50 can be used, one of which is placed spatially separated in between the contact pad 30 and the gliding pad 50, as can be seen in the two lower examples in FIG. 4a. The gap 60 may be arranged in a straight line perpendicular to or at any angle to the contact pad 30 as shown here, or may have any other shape minimizing the force that has to be applied to the first resilient wiping member to cross the gap. The material of the gap is normally the material of the first support member 21, which can be the material of a printed circuit board or any other electrically isolating material. To further reduce abrasion, the gap 60 may comprise a solder mask.

FIG. 5b shows a schematic full sectional view of a slide switch 10 with two gliding pads 50 according to an embodiment of the invention. The gliding pads 50 are arranged next to but electrically isolated from said contact pad 30 so that two gaps 60 are formed. The gaps 60 electrically isolate the contact pad 30 from the one or more gliding pads 50. At the same time it is important that the gap 60 is not too wide to reduce abrasion of the first support member 21, the one terminal 40 in the form of a first resilient wiping member 41, and the other terminal 40 in the form of a second resilient wiping member 42.

As shown when said support members 21,22 are in the second position, the first wiping member 41 is in contact with the gliding pad 50 and has broken contact with said contact pad 30. As a result no electric current can flow between said first wiping member 41 and said contact pad 30.

In the embodiment shown here, the surfaces of the contact pad 30 and the gliding pads 50 are level.

FIG. 6 shows a schematic exploded view of the lower part of a robotic arm 100 of an automated pipetting system comprising a pipetting tip adapter 90 and a slide switch 10 according to an embodiment of the invention used to detect the presence of a pipetting tip 120 on said tip adapter 90.

The slide switch 10 shown here comprises a first support member 21 configured to slide between first and second positions including a contact pad 30 arranged on said first support member 21, and a first wiping member 41 and a second wiping member 42 that are both resilient and in contact with said contact pad 30 when said first support member 21 is in the first position, such that an electric current can flow between said first wiping member 41 and said contact pad 30, and that an electric current can flow between said first wiping member 41 and said second wiping member 42 through said contact pad 30, and such that the first wiping member 41 breaks contact with said contact pad 30 when said first support member 21 slides to the second position, in which no electric current can flow between said first wiping member 41.

Here the first support member 21 comprises a gliding pad 50 arranged next to but electrically isolated from said contact pad 30. The contact pad 30 and gliding pad 50 are spatially separated forming a gap 60. According to the invention said gap 60 may comprise a solder mask. Also the first support member 21 may comprise one or more additional gliding pads 50, which can be placed in said gap 60 as a protective element (not shown). The first wiping member 41 and the second wiping member 42 are physically attached to a second support member 22, which holds both wiping members in place and at an even distance from the contact pad 30 and gliding pad 50. The material of the second support member 22 has to be electrically isolating so that it does not electrically connect the first wiping member 41 with the second wiping member 42. In contrast the contact pad 30 has to be electrically conducting at least on the surface so as to allow an electrical signal circuit to be closed when the first support member 21 is in the first position, and to allow an electrical signal circuit to be open when the first support member 21 is in the second position.

FIG. 7 shows schematic side views of the lower part of a robotic arm 100 of an automated pipetting system according to an embodiment of the invention comprising a slide switch 10 and a pipetting tip adaptor 90 before (left) and after (right) picking up a pipetting tip 120. The slide switch 10 shown here comprises a first support member 21 and a second support member 22 configured to slide relative to one another between first and second positions along a movement axis 110 shown as a dashed line. The slide switch 10 shown on the left is in the first position, which corresponds to the resting position of the pipetting tip adaptor 90 when no pipetting tip 120 is mounted. In this position an electric current can flow between a first wiping member 41 (not shown) and a contact pad 30 (not shown) and the electrical signal circuit comprising an electrical power supply 70 and electrical detection unit 80 is closed. When picking up a pipetting tip 120, the first support member 21 slides relative to the second support member 22 from the first position to the second position. This shift is indicated by dotted lines and an arrows. Shown on the right is the pipetting tip adaptor 90 on which a pipetting tip 120 is mounted. The slide switch 10 in this case is in the second position, in which according to the invention no electric current can flow between a first wiping member 41 (not shown) and a contact pad 30 (not shown) and the electrical signal circuit comprising an electrical power supply 70 and electrical detection unit 80 is open.

Incidentally it is also possible to implement the invention in a variety of variations in hereby shown examples and aspects of the invention highlighted above.

LIST OF REFERENCE SIGNS 10 slide switch
21 first support member 22 second support member
30 contact pad
40 terminal
41 first resilient wiping member
42 second resilient wiping member
50 gliding pad
60 gap
70 electrical power supply
80 electrical detection unit
90 pipetting tip adaptor
100 robotic arm
110 movement axis
120 pipetting tip

The invention claimed is:

1. A robotic arm of an automated pipetting system comprising:
   a pipetting tip adapter and a switch to detect the presence of pipetting tips on said pipetting tip adapter, wherein the switch is a slide switch comprising:
       a first support member and a second support member configured to slide relative to one another between first and second positions along a movement axis when a pipetting tip is mounted on or detached from said pipetting tip adapter,
       an electrically conducting contact pad arranged on said first support member, and
       the first position of said first and second support members defined by an electrically conducting terminal physically attached to said second support member in physical contact with said contact pad, whereas said terminal is a first resilient wiping member expanding along said movement axis, and the second position of said first and second support members is defined when said first wiping member is not in physical contact with said contact pad, and an electric current can flow between said first wiping member and said contact pad when said first and second support members are in the first position, and said electric current between said wiping member and said contact pad is disrupted when said first and second support members are in the second position.

2. The robotic arm according to claim 1, wherein said first support member comprises a printed circuit board.

3. The robotic arm according to claim 1, wherein said first support member and said second support member comprise one or more electrical insulating materials.

4. The robotic arm according to claim 1, wherein said first support member and said second support member comprise one or more of the following materials; glass, paper, polytetrafluoroethylene, and plastic.

5. The robotic arm according to claim 1, wherein said electrically conducting contact pad comprises one or more layers of electrically conducting material consisting of one or more of the following; carbon steel, stainless chrome-nickel steel, vanadium steel, iron, nickel, zinc, brass, copper, platinum, silver, and gold.

6. The robotic arm according to claim 1, wherein a second electrically conducting resilient wiping member expanding along said movement axis is physically attached to said second support member, said second wiping member being in physical contact with said contact pad so that electric current can flow between said first wiping member and said second wiping member across said contact pad when said first and second support members are in the first position.

7. The robotic arm according to claim 6, wherein said second support member electrically isolates said first wiping member from said second wiping member in said second position.

8. The robotic arm according to claim 1 further comprising a gliding pad arranged on said first support member next to but electrically isolated from said contact pad by a gap, and so that said first wiping member is in contact with said gliding pad when said first and second support members are in the second position.

9. The robotic arm according to claim 8, wherein said gap comprises one or more additional gliding pads.

10. The robotic arm according to claim 8, wherein said gap comprises a solder mask.

11. The robotic arm according to claim 8, wherein a surface of said contact pad and said gliding pad are level.

* * * * *